United States Patent
Inose et al.

(10) Patent No.: US 6,173,960 B1
(45) Date of Patent: Jan. 16, 2001

(54) ROD SEAL APPARATUS FOR CYLINDER ASSEMBLY

(75) Inventors: Yasuo Inose; Hiromi Machida, both of Kanagawa-ken (JP)

(73) Assignee: Tokico Ltd., Kawasaki (JP)

( * ) Notice: Under 35 U.S.C. 154(b), the term of this patent shall be extended for 0 days.

(21) Appl. No.: 09/321,094

(22) Filed: May 27, 1999

(30) Foreign Application Priority Data

May 29, 1988 (JP) .................................................. 10-166205

(51) Int. Cl.[7] ....................................................... F16J 15/44
(52) U.S. Cl. ........................... 277/347; 277/476; 277/437
(58) Field of Search ..................................... 277/584, 435, 277/437, 476, 347

(56) References Cited

U.S. PATENT DOCUMENTS 2,994,571 * 8/1961 Peras ................................. 277/437 X
3,268,235 * 8/1966 Jacobellis et al. .................... 277/476
4,917,390 * 4/1990 Lee et al. ......................... 277/476 X

* cited by examiner

Primary Examiner—B. Dayoan
Assistant Examiner—John R. Cottingham
(74) Attorney, Agent, or Firm—Wenderoth, Lind & Ponack, L.L.P.

(57) ABSTRACT

There is provided a seal apparatus for sealing against a rod, comprising a double seal including a rod seal and an O-ring which serves as a back-up ring for the rod seal. The double seal is provided in an annular groove formed on an inner circumferential surface of a rod guide which guides a sliding motion of the rod. An annular partition wall extends from the rod guide so that a force applied to the rod seal from the O-ring is shared between the rod seal and the partition wall. An annular protrusion is formed on a front end surface of the partition wall, so that when the rod seal is pressed with a large force toward the low-pressure side, the protrusion bites into a stepped surface of the rod seal and a front end surface of the rod seal is brought into contact with a low-pressure-side seal-bearing surface of the rod guide. The force applied to the rod seal is distributed to two sites. This provides an ideal contact surface pressure distribution with respect to a surface of contact between the rod seal and the rod, without being affected by a dimensional error and a difference in thermal expansion.

5 Claims, 4 Drawing Sheets

ROD SEAL APPARATUS FOR CYLINDER ASSEMBLY

BACKGROUND OF THE INVENTION

The present invention relates to a seal apparatus for sealing against a rod in a cylinder assembly such as a hydraulic cylinder for adjustment of a vehicle height, a hydraulic shock-absorber, etc.

In the above-mentioned cylinder assembly, a rod extends from an inside to an outside of a cylinder, and is slidably supported by a rod guide provided in the cylinder. For sealing a gap between the rod and the rod guide, in many cases, a double seal apparatus and an oil seal are arranged in the direction of the axis of the rod. The double seal apparatus comprises a rod seal which engages the rod, and a back-up ring which is provided radially outward of the rod seal to bias the rod seal toward the rod. A fluid which has leaked from an area between the rod and the rod seal is completely prevented from leaking to the outside, by means of the oil seal.

In the double seal apparatus, when axial compression of the back-up ring occurs due to the effect of the pressure of the fluid, the back-up ring radially expands and presses the rod seal against the rod. In order to prevent the application of an excessive force to the rod seal, a short partition wall is provided between the rod seal and the back-up ring. However, in the double seal apparatus in which the above-mentioned partition wall is provided, when the rod seal receives an axial-force due to the effect of the pressure of the fluid, the rod seal applies a force to the rod in an undesirable manner, which is caused by a dimensional error in production and thermal deformation of the partition wall and the rod seal.

SUMMARY OF THE INVENTION

In view of the above, the present invention has been made. It is an object of the present invention to provide a rod seal apparatus for a cylinder assembly, which is capable of always achieving an ideal contact surface pressure distribution with respect to a surface of contact between a rod seal and a rod, without being affected by a dimensional error and a difference in thermal expansion. In the rod seal apparatus of the present invention, not only can stable sealing performance be ensured, but also the wear life of the rod seal can be increased.

According to the present invention, there is provided a rod seal apparatus for sealing a gap between a rod and a rod guide. The rod guide is adapted to guide a sliding motion of the rod and defines a low-pressure side and a high-pressure side. The rod seal apparatus is provided in the rod guide and comprises a double seal provided within an annular groove formed on the inner circumferential surface of the rod guide. The double seal includes a rod seal which makes sliding contact with the rod and a back-up ring which resiliently biases the rod seal toward the rod. The rod seal has a stepped portion formed on an outer circumferential surface thereof. The rod seal apparatus also comprises a partition wall which extends from a seal-bearing surface on the low-pressure side of the annular groove toward a seal-bearing surface on the high-pressure side of the annular groove and is received in the stepped portion of the rod seal so that the rod seal and the back-up ring are partially separated from each other by the partition wall. The partition wall has a first abutment surface and the stepped portion of the rod seal has a second abutment surface, and the first abutment surface and the second abutment surface axially face each other. At least one abutment surface selected from the first abutment surface and the second abutment surface includes an engaging protrusion for engagement with the first abutment surface or second abutment surface axially facing the engagement protrusion.

In the above-mentioned rod seal apparatus, when the rod seal has force applied from the high-pressure side, the rod seal may deform so that the engaging protrusion restricts radial movement of the rod seal.

The foregoing and other objects, features and advantages of the present invention will be apparent from the following detailed description and appended claims taken in connecting with the accompanying drawings.

DETAILED DESCRIPTION OF THE INVENTION

Before explaining embodiments of the present invention, the technique which is considered as the closest prior art with respect to the present invention is explained, for easy understanding of the present invention.

Figure 6:
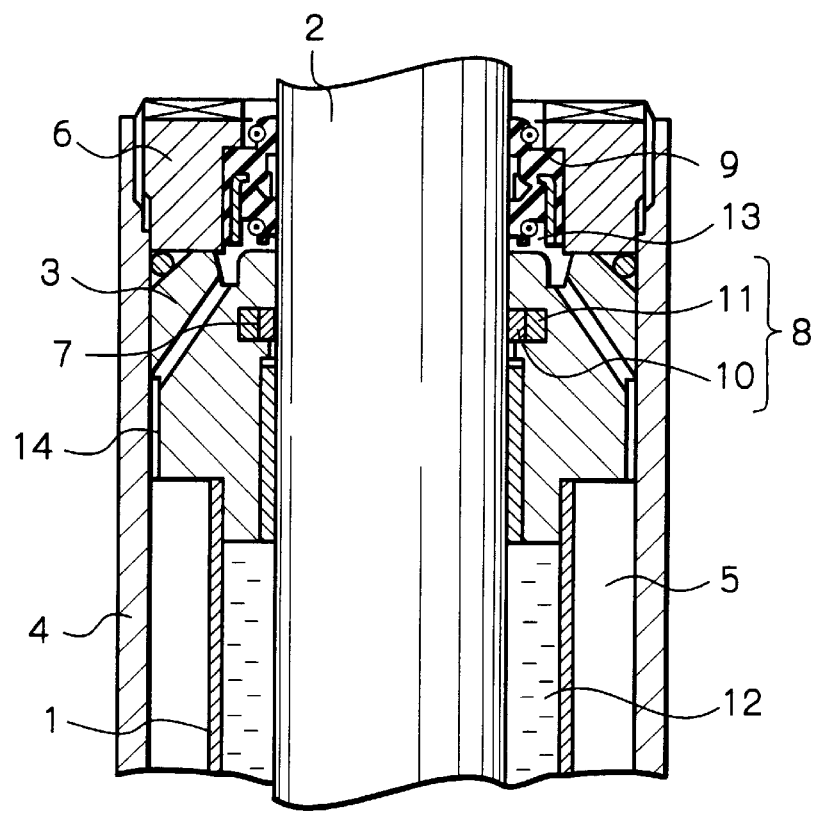
FIG. 6 is a cross-sectional view showing an entire structure of an example of the conventional rod seal apparatus.

For example, in a hydraulic cylinder for adjustment of a vehicle height, as shown in FIG. 6, a piston (not shown) is slidably fitted in a cylinder 1 in which a hydraulic fluid is sealably contained. A rod 2 having one end connected to the piston is slidably provided in a rod guide 3 attached to an open end portion of the cylinder 1 so that the other end of the rod 2 extends to an outside of the cylinder 1. The cylinder 1 is contained in an outer cylinder 4 having one end closed, and the rod guide 3 is not only adapted to guide a sliding motion of the rod 2 but also serves as a cover member for closing an annular chamber 5 formed between the outer cylinder 4 and the cylinder 1. The rod guide 3 is held in position by a lock ring 6 threadably engaged with an open end portion of the outlet cylinder 4. A hydraulic fluid passage (not shown) is formed in the rod 2. The hydraulic fluid is supplied to and discharged from the cylinder 1 through external hydraulic fluid supply/discharge means (not shown) and the hydraulic fluid passage. The rod 2 advances or retracts according to the flow of hydraulic fluid, thereby adjusting the vehicle height.

In a hydraulic cylinder of this type, generally, a gap between the rod 2 and the rod guide 3 is sealed in two steps by means of a double seal 8 and an oil seal 9. The double seal 8 is provided in an annular groove 7 formed on an inner circumferential surface of the rod guide 3. The oil seal 9 is provided inside the lock ring 6. The double seal 8 comprises a rod seal 10 which makes sliding contact with the rod 2 and a back-up ring (O-ring) 11 which resiliently biases the rod seal 10 toward the rod 2. As the material for the rod seal 10, a material which is excellent in sliding performance, for example, fluororesin is employed, from the viewpoint of sliding properties. According to a rise in hydraulic pressure in a cylinder chamber 12, the hydraulic fluid leaks in a small amount from an area between the rod seal 10 and the rod 2. The oil seal 9 is made of rubber having good sealability. Due to the presence of the oil seal 9, the hydraulic fluid which has leaked from the area between the rod seal 10 and the rod 2 does not leak to the outside, but is temporarily held in an oil sump 13 between the double seal 9 and the oil seal 9 and then flows into the annular chamber (drain chamber) 5 through a hydraulic fluid passage 14 formed in the rod guide 3.

In the hydraulic cylinder arranged as mentioned above, due to a difference in pressure between the cylinder chamber 12 on the high-pressure side and the oil sump 13 on the low-pressure side, the back-up ring 11 is moved upward. When the difference in pressure between the cylinder chamber 12 and the oil sump 13 exceeds a certain level, the back-up ring 11 is pressed with large force against a low-pressure-side seal-bearing surface $3a$, (FIG. 7) of the rod guide 3 in the annular groove 7, so that the back-up ring 11 is compressed, and presses the rod seal 10 with large force against the rod 2. Consequently, frictional resistance between the rod seal 10 and the rod 2 increases. This prevents smooth movement of the rod 2, leading to poor riding quality. Further, the amount of wear on the rod seal 10 increases, so that the amount of leakage of the hydraulic fluid from the cylinder chamber 12 toward the oil sump 13 becomes undesirably large.

In a hydraulic shock-absorber, as in the case of the hydraulic cylinder for adjustment of a vehicle height, a double seal such as the above-mentioned double seal 8 comprising the rod seal 10 and the back-up ring 11 is employed. Such a hydraulic shock-absorber has the same problems as mentioned above in connection with the hydraulic cylinder for adjustment of a vehicle height. It should be noted that in the hydraulic shock-absorber, the annular chamber 5 formed around the cylinder 1 serves as a reservoir.

Figure 7:
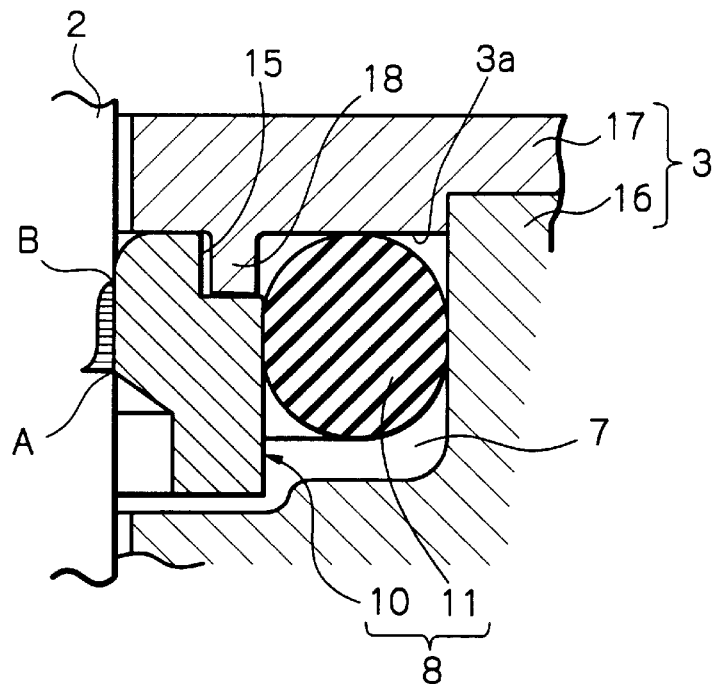
FIG. 7 is a cross-sectional view showing a structure of another example of the conventional rod seal apparatus.

As a countermeasure for the above-mentioned problems, Japanese Patent Application Public Disclosure (Kokai) No. 10-54436 discloses a seal structure arranged as shown in FIG. 7. In this structure, a stepped portion 15 is formed on an outer circumferential surface of a front end portion on the low-pressure side of the rod seal 10. The rod guide 3 comprises two members, namely, a guide body 16 and a cover member 17. Further, an annular partition wall 18 extends from the cover member 17 and is received in the stepped portion 15. By this arrangement, when the difference in pressure between the cylinder chamber 12 (the high-pressure side) and the oil sump 13 (the low-pressure side) becomes large and the back-up ring 11 biases the rod seal 10 with large force toward the rod 2, the partition wall 18 of the rod guide 3 shares the force from the back-up ring 11 with the rod seal 10. Consequently, the rod seal 10 is not pressed with large force against the rod 2.

A diagram shown on the left-hand side of FIG. 7 shows an ideal contact surface pressure distribution with respect to a surface of contact between the rod seal 10 and the rod 2. As shown in the diagram, it is desirable that the contact surface pressure distribution with respect to the surface of contact between the rod seal 10 and the rod 2 (hereinafter, frequently referred to simply as "the contact surface pressure distribution") be expressed by a gentle curve indicating that the surface pressure is the highest in the vicinity of a terminal point of contact A on the high-pressure side and the lowest in the vicinity of a terminal point of contact B on the low-pressure side. When the contact surface pressure distribution as shown in the diagram in FIG. 7 is obtained, the amount of leakage of the hydraulic fluid from the cylinder chamber 12 toward the oil sump 13 is extremely small, so that desired sealing performance can be ensured.

However, the seal structure disclosed in Kokai No. 10-54436 is disadvantageous as explained below.

Figure 8A:
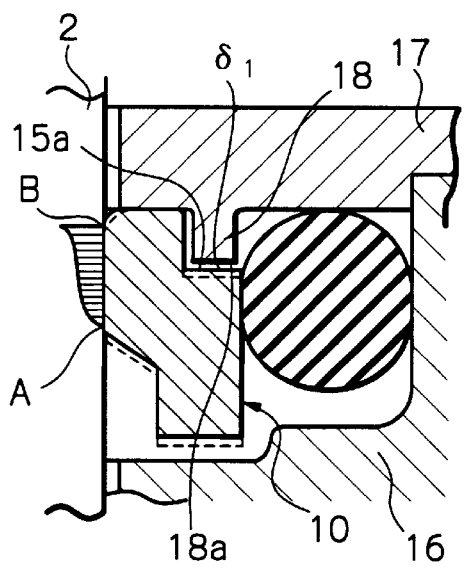
FIGS. 8A and 8B are cross-sectional views explaining problems accompanying the conventional rod seal apparatus of FIG. 7.
Figure 8B:
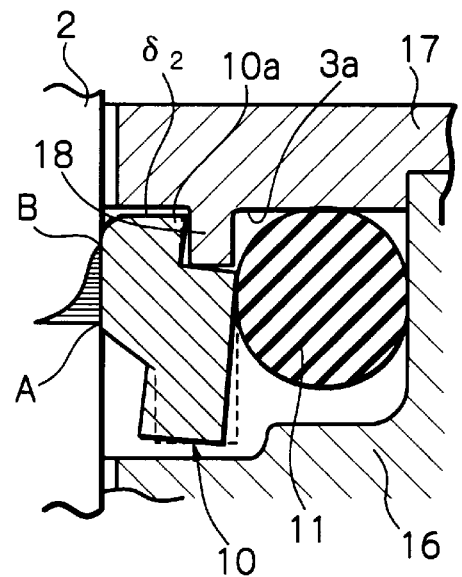

FIGS. 8A and 8B are explanatory views explaining problems accompanying the above-mentioned seal structure. In the seal structure in an assembled state, due to dimensional tolerances in the rod seal 10 and the cover member 17 of the rod guide 3, a small gap δ1 between a stepped surface $15a$ in the stepped portion 15 of the rod seal 10 and a distal end surface $18a$ of the partition wall 18, that is, between abutment surfaces of the rod seal 10 and the partition wall 18 (FIG. 8A), or a small gap δ2 between a front end surface $10a$ of the rod seal 10 and the low-pressure-side seal-bearing surface $3a$ of the rod guide 3 (FIG. 8B) is likely to be formed. Even when no gaps such as the above-mentioned gaps δ1 and δ2 exist in the seal structure in an assembled state, due to a large difference in coefficient of linear thermal expansion between the rod seal 10 made of fluororesin and the rod guide 3 made of steel, the gap δ1 and δ2 is formed according to a temperature rise which is caused by, for example, friction heat generated during use.

When the gap δ1 between the abutment surfaces of the rod seal 10 and the partition wall 18 is formed as shown in FIG. 8A, due to the above-mentioned difference in pressure between the high-pressure side and the low-pressure side, the front end portion of the rod seal 10 is pressed with large force against the low-pressure-side seal-bearing surface $3a$ of the rod guide 3. Consequently, the front end portion of the rod seal 10 is depressed and the contact surface pressure distribution is obtained in a state as shown in a diagram on the left-hand side of FIG. 8A, in which the surface pressure in the vicinity of the terminal point of contact A on the high-pressure side becomes low, while the surface pressure in the vicinity of the terminal point of contact B on the low-pressure side becomes high. Thus, the contact surface pressure distribution is largely displaced from the above-mentioned ideal curve. In this case, deterioration of sealing performance occurs and the amount of leakage of the hydraulic fluid from the cylinder chamber 12 toward the oil sump 13 becomes large.

On the other hand, when the gap δ2 between the front end surface $10a$ of the rod seal 10 and the low-pressure-side seal-bearing surface $3a$ of the rod guide 3 is formed as shown in FIG. 8B, a moment acts on the rod seal 10 in a direction for effecting radially inward movement of a rear end portion (the high-pressure side) thereof. Therefore, the rod seal 10 deforms so that the rear end portion of the rod seal 10 moves radially inward. Consequently, the contact surface pressure distribution is obtained in a state as shown in a diagram on the left-hand side of FIG. 8B, in which the surface pressure in the vicinity of the terminal point of contact A on the high-pressure side becomes extremely high. Thus, the contact surface pressure distribution is largely displaced from the above-mentioned ideal curve, and wear on the rod seal 10 markedly proceeds.

Hereinbelow, embodiments of the present invention are described, referring to the accompanying drawings.

Figure 1:
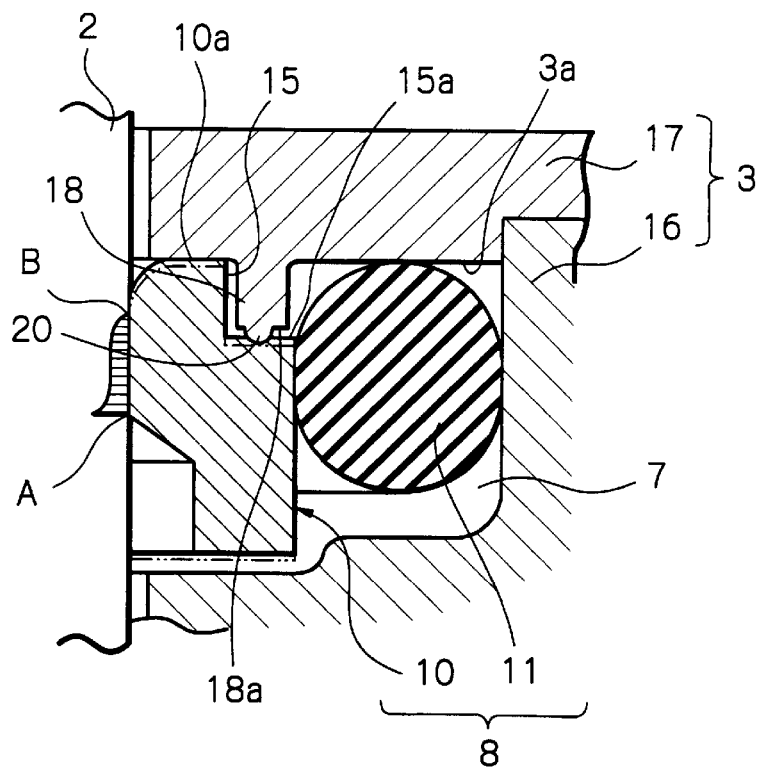
FIG. 1 is a cross-sectional view showing a structure of a rod seal apparatus according to a first embodiment of the present invention.

FIG. 1 shows a rod seal apparatus according to a first embodiment of the present invention, which is applied to the hydraulic cylinder shown in FIG. 6. A basic structure of the rod seal apparatus of the present invention is substantially the same as that of the seal structure of FIG. 7. Therefore, in the below-mentioned embodiments, the same members or portions as those shown in FIG. 7 are denoted by the same reference numerals and characters.

A characteristic feature of the rod seal apparatus in the first embodiment of the present invention resides in that in the cover member 17 of the rod guide 3, a projection (engaging projection) 20 is formed to extend on the distal end surface 18a of the partition wall 18 in a circumferential direction thereof so that the projection 20 abuts against (engages) a part of the stepped surface 15a in the stepped portion 15 formed in the rod seal 10. In this embodiment, the projection 20 has a semi-circular cross-section and the width of a base portion of the projection 20 is determined as being sufficiently small as compared to the width of the distal end surface 18a of the partition wall 18. It should be noted that the projection 20 may be formed continuously or discontinoiusly, as long as it extends in the circumferential direction. The depth of the stepped portion 15 of the rod seal 10 is determined so that when the projection 20 abuts against the stepped surface 15a, the front end surface 10a of the rod seal 10 is slightly in contact with or slightly spaced apart from the low-pressure-side seal-bearing surface 3a of the rod guide 3.

In the first embodiment of the present invention, when the difference in pressure between the cylinder chamber 12 on the high-pressure side and the oil sump 13 on the low-pressure side of FIG. 6 becomes large, the rod seal 10 is pressed with large force toward the cover member 17 of the rod guide 3 (toward the low-pressure-side seal-bearing surface 3a) and is compressed. Illustratively stated, as shown in FIG. 1, the projection 20 formed on the distal end surface 18a of the partition wall 18 bites into the stepped surface 15a of the rod seal 10, so that the rod seal 10 advances toward the low-pressure side by a distance corresponding to the bite of the projection 20 and the front end portion of the rod seal 10 is pressed against the low-pressure-side seal-bearing surface 3a of the rod guide 3. That is, the force applied to the rod seal 10 is distributed to two sites, namely, the portion of the rod seal 10 in contact with the projection 20, i.e., the abutment surface of the rod seal 10 against the partition wall 18, and the portion of the rod seal 10 in contact with the low-pressure-side seal-bearing surface 3a of the rod guide 3. Consequently, the front end portion of the rod seal 10 is not depressed markedly as shown in FIG. 8A. Further, deformation of the rod seal 10 as a whole as shown in FIG. 8B such that the rear end portion moves radially inward, i.e., radial movement of the rod seal 10, is restricted. That is, as shown in a diagram on the left-hand side of FIG. 1, the contact surface pressure distribution with respect to the surface of contact between the rod seal 10 and the rod 2 is obtained in an ideal state which is expressed by a gentle curve indicating that the surface pressure is the highest in the vicinity of the terminal point of contact A on the high-pressure side and the lowest in the vicinity of the terminal point of contact B on the low-pressure side.

Figure 2:
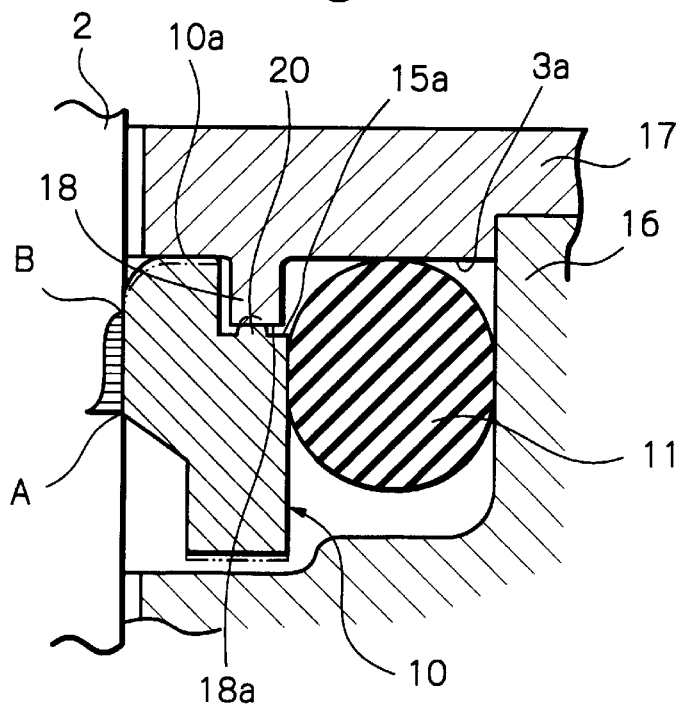
FIG. 2 is a cross-sectional view showing a structure of a modified example of the rod seal apparatus of FIG. 1.

In the first embodiment of the present invention, the projection 20 may be formed on the stepped surface 15a of the rod seal 10, instead of the distal end surface 18a of the partition wall 18, as shown in FIG. 2. In this case, when the difference in pressure between the high-pressure side and the low-pressure side becomes large, the projection 20 of the rod seal 10 is pressed with large force against the distal end surface 18a of the partition wall 18 and deforms. Consequently, as in the case of the projection 20 being formed on the distal end surface 18a of the partition wall 18, the rod seal 10 advances toward the low-pressure side and the front end portion of the rod seal 10 is pressed against the low-pressure-side seal-bearing surface 3a. Thus, as in the case of the projection 20 being formed on the distal end surface 18a of the partition wall 18, the force applied to the rod seal 10 is distributed to two sites, namely, the abutment surface of the rod seal 10 against the partition wall 18 and the portion of the rod seal 10 in contact with the low-pressure-side seal-bearing surface 3a of the rod guide 3. Further, radial movement of the rod seal 10 is restricted due to the friction between the projection 20 and the distal end surface 18a. The contact surface pressure distribution is obtained in the ideal state as shown in a diagram on the left-hand side of FIG. 2.

Figure 3:
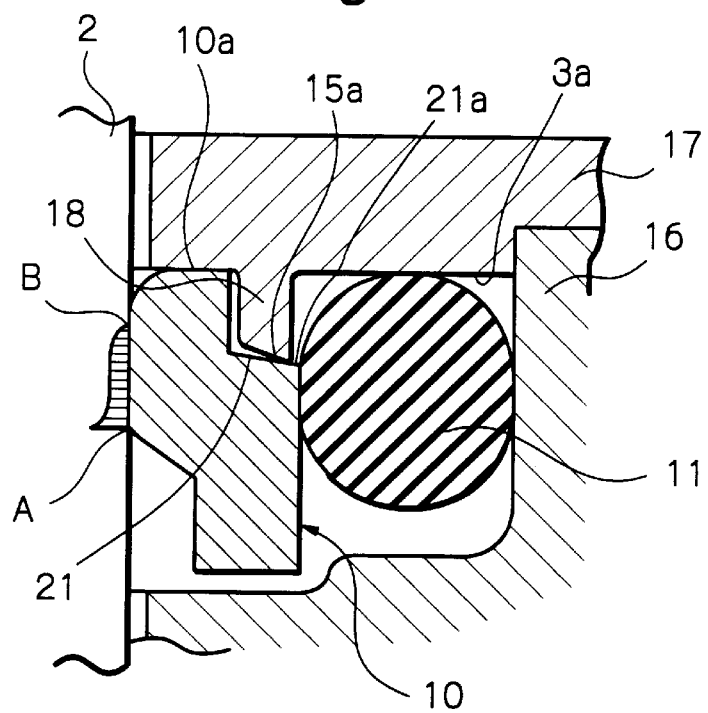
FIG. 3 is a cross-sectional view showing a structure of a rod seal apparatus according to a second embodiment of the present invention.

FIG. 3 shows a second embodiment of the present invention. In a rod seal apparatus in the second embodiment of the present invention, in the cover member 17 of the rod guide 3, the distal end surface of the partition wall 18 is formed onto a radially inclined surface 21 so that an edge (engaging protrusion) 21a of the inclined surface 21 abuts against a part of the stepped surface 15a in the stepped portion 15 formed in the rod seal 10. In this case, it is preferred that the inclined surface 21 be inclined downwardly toward an outer circumferential surface of the partition wall 18 so that an outer circumferential portion of the edge 21a of the inclined surface 21 makes contact with a part of the stepped surface 15a of the rod seal 10.

In the second embodiment of the present invention, when the difference in pressure between the high-pressure side and the low-pressure side becomes large, the edge 21a of the inclined surface 21 formed in the partition wall 18 bites into the stepped surface 15a of the rod seal 10, so that as in the case of the first embodiment, the rod seal 10 moves towards the low-pressure side and the front end portion of the rod seal 10 is pressed against the low-pressure-side seal-bearing surface 3a of the rod guide 3. Thus, the force applied to the rod seal 10 is distributed to two sites, namely, the abutment surface of the rod seal 10 against the partition wall 18 and the portion of the rod seal 10 in contact with the low-pressure-side seal-bearing surface 3a of the rod guide 3. Further, radial movement of the rod seal 10 is restricted. Therefore, as shown in a diagram on the left-hand side of FIG. 3, the contact surface pressure distribution is obtained in the ideal state.

Figure 4:
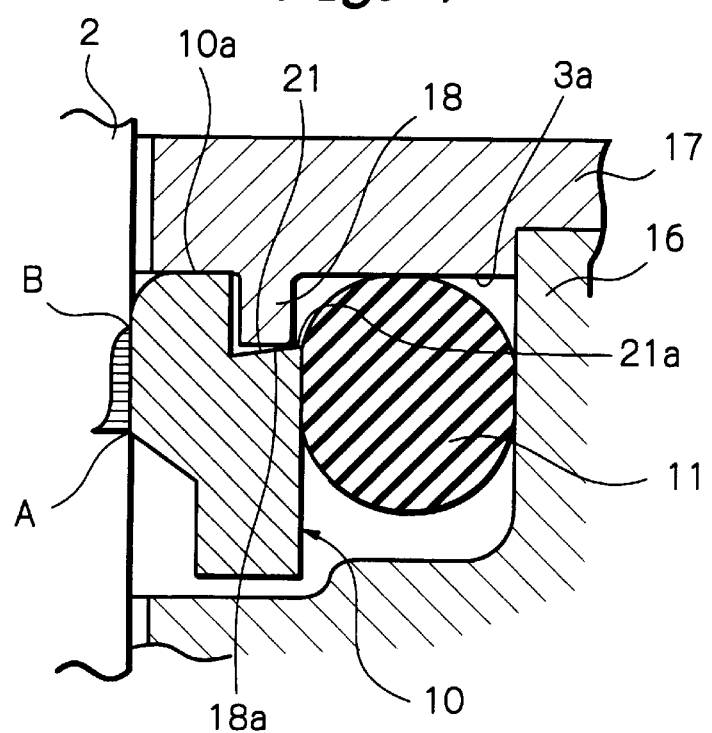
FIG. 4 is a cross-sectional view showing a structure of a modified example of the rod seal apparatus of FIG. 3.

In the second embodiment of the present invention, instead of the distal end surface of the partition wall 18, the stepped surface 15a of the rod seal 10 may be formed into the inclined surface 21 as shown in FIG. 4. In this case, it is preferred that the inclined surface 21 be inclined upwardly toward the outer circumferential surface of the rod seal 10. By this arrangement, when the difference in pressure between the high-pressure side and the low-pressure side becomes large, the edge 21a of the inclined surface 21 of the rod seal 10 is pressed with large force against the distal end surface 18a of the partition wall 18 and deforms. Consequently, as in the case of the inclined surface 21 being formed in the partition wall 18, the rod seal 10 moves toward the low-pressure side and the front end portion of the rod seal 10 is pressed against the low-pressure-side seal-bearing surface 3a. Thus, as in the case of the inclined surface 21 being formed in the partition wall 18, the force applied to the rod seal 10 is distributed to two sites, namely, the abutment surface of the rod seal 10 against the partition wall 18 and the portion of the rod seal 10 in caontact with the low-pressure-side seal-bearing surface 3a of the rod guide 3. Further, radial movement of the rod seal 10 is restricted. Therefore, the contact surface pressure distribution is obtained in the ideal state as shown in a digram on the left-hand side of FIG. 4.

Figure 5:
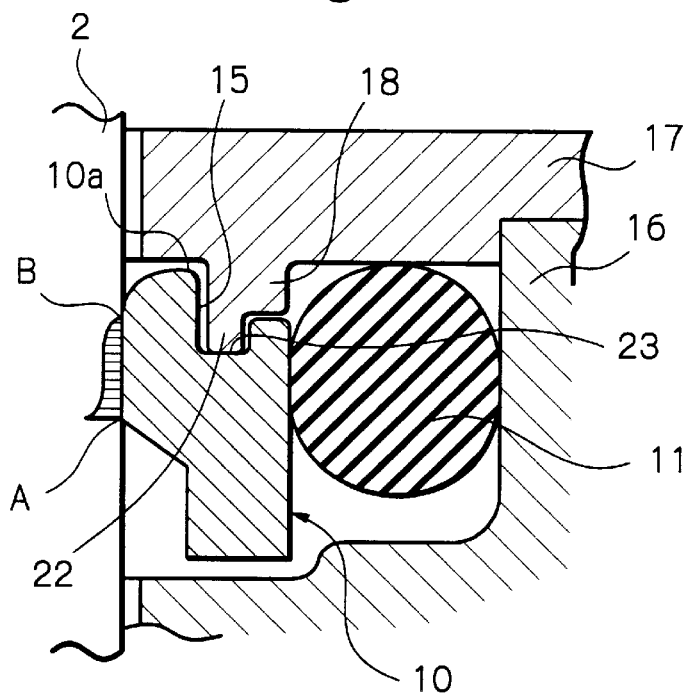
FIG. 5 is a cross-sectional view showing a structure of a rod seal apparatus according to a third embodiment of the present invention.

FIG. 5 shows a third embodiment of the present invention. In a rod seal apparatus in the third embodiment of the present invention, in the cover member 17 of the rod guide 3, an annular projection (engaging projection) 22 is formed to extend on the distal end surface 18a of the partition wall 18 in the circumerfernaital direction thereof and a groove 23 adapted to have the projection 22 fitted therein is formed on the stepped surface 15a in the stepped portion 15 formed in the rod seal 10. The partition wall 18 and the rod seal 10 are engaged with each other at the bottom of the groove 23 by fitting the projection 22 into the groove 23. In this embodiment, the depth of the stepped portion 15 of the rod seal 10 is determined so that the front end portion of the rod seal 10 is spaced apart from the low-pressure-side seal-bearing surface 3a of the rod guide 3.

In the third embodiment of the present invention, when the difference in pressure between the high-pressure side and the low-pressure side becomes large and, as shown in FIG. 8B, a moment acts on the rod seal 10 in the direction for effecting radially inward movement of the rear end portion of the rod seal 10, respective lateral surfaces of the projection 22 and the groove 23 make contact with each other, thereby restricting radial movement of the rod seal 10. That is, general deformation of the rod seal 10 is suppressed. Consequently, the contact surface pressure distribution is obtained in the ideal state as shown in a diagram on the left-hand side of FIG. 5.

In the third embodiment, the projection 22 and the groove 23 may be arranged, such that the projection 22 is formed on the stepped surface 15a of the rod seal 10 and the groove 23 is formed on the distal end surface 18a of the partition wall 18. In this case, the same effects as those in the case of projection 22 being formed on the distal end surface 18a and the groove 23 being formed on the stepped surface 15a can be exerted.

As has been described above, in the rod seal apparatus of the present invention, an engaging protrusion is formed on at least one abutment surface selected from an abutment surface of the partition wall of the rod guide and an abutment surface of the stepped portion of the rod seal which axially faces the abutment surface of the partition wall. The engaging protrusion is adapted to engage the abutment surface axially facing the engaging portion. Therefore, the contact surface pressure distribution with respect to a surface of contact between the rod seal and the rod can always be obtained in an ideal state. By this arrangement, not only can stable sealing performance be ensured, but also the wear life of the rod seal can be increased to a maximum degree. Further, it is not a requisite that the front end surface of the rod seal and the low-pressure-side seal-bearing surface of the rod guide be in contact with each other, so it is unnecessary to form those surfaces of the rod seal and the rod guide with high precision, leading to a reduction in production cost.

What is claimed is:

1. A rod seal apparatus for sealing a gap between a rod and a rod guide, the rod guide being adapted to guide a sliding motion of the rod and defining a low-pressure side and a high-pressure side, the rod seal apparatus being provided in the rod guide and comprising:

a double seal provided within an annular groove formed on an inner circumferential surface of the rod guide, the double seal including a rod seal which makes sliding contact with the rod and a back-up ring which resiliently biases the rod seal toward the rod, the rod seal having a stepped portion formed on an outer circumferential surface thereof; and a partition wall which extends from a seal-bearing surface on the low-pressure side of the annular groove toward a seal-bearing surface on the high-pressure side of the annular groove and is received in the stepped portion of the rod seal so that the rod seal and the back-up ring are partially separated from each other by the partition wall, the partition wall having a first abutment surface and the stepped portion of the rod seal having a second abutment surface, the first abutment surface and the second abutment surface axially facing each other, wherein at least one abutment surface selected from the first abutment surface and the second abutment surface includes an engaging protrusion for engagement with the first abutment surface or second abutment surface axially facing the engaging protrusion.

2. A rod seal apparatus according to claim 1, wherein when the rod seal has force applied from the high-pressure side, the rod seal deforms so that the engaging protrusion restricts radial movement of the rod seal.

3. A rod seal apparatus according to claim 2, wherein said rod seal has a front end portion which is spaced apart from said seal-bearing surface of the low-pressure side when said rod seal is not deformed.

4. A rod seal apparatus according to claim 1, wherein said protrusion is a projection extending from said one of the first and second abutment surfaces.

5. A rod seal apparatus according to claim 1, wherein said one of the first and second abutment surfaces is inclined and said protrusion is defined by a peripheral edge of said one of the first and second abutment surfaces.

* * * * *

UNITED STATES PATENT AND TRADEMARK OFFICE
CERTIFICATE OF CORRECTION

PATENT NO. : 6,173,960 B1
DATED : January 16, 2001
INVENTOR(S) : Yasuo Inose et al.

It is certified that error appears in the above-identified patent and that said Letters Patent is hereby corrected as shown below:

<u>Title page,</u>
Item [30], line 1, change "May 29, 1988" to -- May 29, 1998 --.

Signed and Sealed this

Sixteenth Day of October, 2001

Attest:

*Nicholas P. Godici*

NICHOLAS P. GODICI
*Acting Director of the United States Patent and Trademark Office*

*Attesting Officer*